Patented Apr. 21, 1925.

1,534,929

UNITED STATES PATENT OFFICE.

HENRY V. DUNHAM, OF MOUNT VERNON, NEW YORK.

MANUFACTURE OF CHEWING GUM.

No Drawing.    Application filed July 11, 1922. Serial No. 574,293.

*To all whom it may concern:*

Be it known that I, HENRY V. DUNHAM, a citizen of the United States, residing at Mount Vernon, in the county of Westchester and State of New York, have invented certain new and useful Improvements in the Manufacture of Chewing Gum, of which the following is a specification.

The present invention relates to the manufacture of material suitable for use in chewing gum.

Attempts have heretofore been made to produce a chewing gum base by mixing rubber with paraffin wax and adding gum chicle or similar gum to the mixture. These attempts have not been satisfactory, for the reason that the product produced is too soft, and does not possess the desired consistency whereby it can be masticated for a long period. Attempts have also been made to substitute ordinary fats or oils (natural glycerides of fatty acids) in place of paraffin in the above mixture, but these yield products which also are too soft, oily and sticky. The mixture tends to stick to the teeth and roof of the mouth and also does not possess the desired consistency and stability.

I have now found that it is possible to produce a chewing gum base of excellent quality by the use of hydrogenated fatty oils, with rubber and chicle. In the preferred form of the invention, I employ a hydrogenated oil having a melting point of about 55 to 65° C., with which may be associated also some paraffin wax, if desired. This material is first heated to a temperature substantially above the melting point of rubber, say to about 150° C., or even higher, and the rubber is then gradually added to the hot material, preferably with continuous stirring. The stirring is continued until a uniform smooth mixture is obtained. The proportion may be about 50 pounds of hydrogenated oil, say hydrogenated peanut oil having a melting point of about 62° C., and 50 pounds of plantation sheet rubber, or other rubber. The consistency of the product should preferably be firmer than that of ordinary gum chicle. To this mixture is then added gum chicle in such proportion as to produce the required consistency, or if desired, enough gum chicle can be added to produce a softer mass than is desired for the final product, and thereafter a resinous material is added, to improve the consistency of the mass. It is to be understood that the materials used should preferably be suitably cleaned before using, and should be free from constituents injurious to health. Without limiting myself to particular details, I give the following examples, for the purpose of illustration:

To 7 pounds of a mixture of hydrogenated soya bean oil (M. P. 67° C.) with rubber in equal proportions are added 3 pounds of chicle.

To 10 pounds of a mixture of hydrogenated peanut oil (M. P. 62° C.) with rubber in equal proportions are added 5 pounds of chicle.

To a mixture of 6 pounds of hydrogenated cotton seed oil (M. P. 52° C.) with 5 pounds of rubber are added 5 pounds of chicle and 4 pounds of purified dammar resin.

I claim:

1. A chewing gum containing hydrogenated oil of a melting point not substantially below 52° C., and rubber.

2. A chewing gum containing hydrogenated oil of a melting point between about 52 and 65° C., rubber and gum chicle.

3. A chewing gum containing hydrogenated oil of a melting point between about 52 and 65° C., rubber, gum chicle and a resinous material.

4. In the manufacture of chewing gum, the step of heating together, with agitation, a hydrogenated oil of a melting point between about 52 and 65° C. with rubber to form a uniform smooth mixture.

In testimony whereof I affix my signature.

HENRY V. DUNHAM.